United States Patent
Nakano et al.

(10) Patent No.: US 6,798,974 B1
(45) Date of Patent: Sep. 28, 2004

(54) SIGNAL SUPPLYING APPARATUS, SIGNAL PROCESSING METHOD AND RECORD MEDIUM

(75) Inventors: Takehiko Nakano, Kanagawa (JP); Mariko Kitajima, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/575,859

(22) Filed: May 19, 2000

(30) Foreign Application Priority Data

Dec. 2, 1999 (JP) .......................................... 11-343374

(51) Int. Cl.[7] .................................................. H04N 5/91
(52) U.S. Cl. ...................................... 386/94; 380/201
(58) Field of Search ............................... 386/1, 46, 94, 386/125, 126; 380/201; 725/25–31, 52, 91

(56) References Cited

U.S. PATENT DOCUMENTS

| 6,249,532 | B1 | * | 6/2001 | Yoshikawa et al. | ........... 725/28 |
| 6,367,079 | B1 | * | 4/2002 | De Vos et al. | ................ 725/52 |
| 6,381,747 | B1 | * | 4/2002 | Wonfor et al. | ................ 386/94 |
| 6,473,902 | B1 | * | 10/2002 | Noritomi | ..................... 725/91 |
| 6,628,891 | B1 | * | 9/2003 | Vantalon et al. | .............. 386/94 |

FOREIGN PATENT DOCUMENTS

| EP | 0 860 823 | 8/1998 |
| EP | 0 913 997 | 5/1999 |
| EP | 0 959 467 | 11/1999 |

* cited by examiner

Primary Examiner—Thai Tran
Assistant Examiner—Christopher Onuaku
(74) Attorney, Agent, or Firm—Frommer Lawrence & Haug LLP; William S. Frommer

(57) ABSTRACT

A plurality of copies of an information signal are prevented from being formed. For example, a transmitter such as IRD, STB, or the like transmits an information signal supplied from the outside via a radio wave or the like to each apparatus in a system. Together with a monitor, a speaker, and the like, for example, two recorders such as VTRs or the like are provided in the system. It is assumed that the recorder is executing the recording operation. The transmitter recognizes that the recorder is under the recording operation. Even if the other recorder issues a request indicating that it wants to perform the recording operation in this situation, the operation responsive to the request is not permitted. By such a management, a plurality of recorders in the network are prevented from recording the same information signal. A plurality of copies are prevented from being formed with respect to the same information signal.

14 Claims, 15 Drawing Sheets

Fig. 17A  VIDEO TRANSMISSION
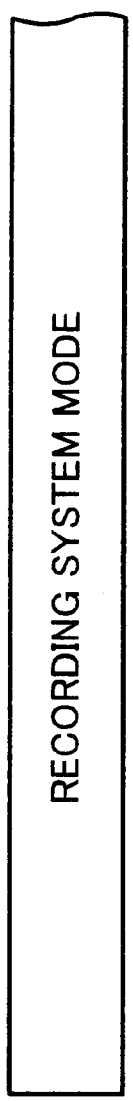
Fig. 17B  RECORDING SYSTEM MODE
Fig. 17C  NON-RECORDING MODE
Fig. 17D  VIDEO RECEPTION

SIGNAL SUPPLYING APPARATUS, SIGNAL PROCESSING METHOD AND RECORD MEDIUM

BACKGROUND OF THE INVENTION

1. Field of the Invention

The invention relates to a signal supplying apparatus, a signal processing method and a record medium with respect to the recording of, for example, toll information which is provided through a radio wave or information which is provided through a commercially available recording medium.

2. Description of the Related Art

For example, in a television broadcasting or the like, information regarding how an information signal transmitted from a broadcasting station is used on the reception side, for example, information about whether the information signal is monitored in a real-time manner or subjected to, for instance, the recording or the like is not known on the broadcasting station side. A tuner as a receiver in a network on the reception side is not equipped with a function to know how many apparatuses having the recording function are included among the apparatuses connected to the self apparatus, a function to know how many apparatuses are recording the information signal received at a certain time point and transmitted to the network, or the like. Therefore, such a situation that a plurality of copies are formed on the basis of the information signal which is supplied from the broadcasting station to the network via one receiver cannot be prevented.

In a broadcasting service such as an existing ground wave broadcasting or the like for which an information fee is not charged, the above-mentioned drawback is not particularly a problem. However, the above drawback becomes a problem in a toll information providing service in which an information fee is charged for information that is provided. That is, an information fee is usually charged every receiver in such a case and if a plurality of recorders are connected to the receiver, it is possible that more copies than a predetermined number are formed, although it is permitted to form only the limited number (for example, one or more) of copies for a predetermined information fee and under a contract or the like.

In the case where the broadcasting station integratedly manages them, as a method of managing the recording operations, it is possible to consider a method of charging a high information fee, a method of deteriorating a quality of information, or the like, on the assumption that many copies are formed. However, those methods are not practical because a management region is too wide.

OBJECTS AND SUMMARY OF THE INVENTION

It is, therefore, an object of the invention to provide a signal supplying apparatus, a signal processing method and a record medium which can prevent such a situation that copies about a received signal are formed without restriction.

According to a preferred aspect of the invention, there is provided a signal supplying apparatus for supplying a signal to each of apparatuses having a signal recording function in a signal processing system including a predetermined number of apparatuses having the signal recording function, wherein it is managed so as to permit the recording operation to a predetermined number of apparatuses having the signal recording function.

According to another aspect of the invention, there is provided a signal processing method of supplying a signal to each of apparatuses having a signal recording function in a signal processing system including a predetermined number of apparatuses having the signal recording function, wherein it is managed so as to permit the recording operation to a predetermined number of apparatuses having the signal recording function.

According to the invention, for example, such a situation that a signal which is supplied from a receiver or the like to each apparatus in a system is recorded by recorders of the number larger than a predetermined number (for example, one or the like) is prevented.

According to the invention, there is provided a record medium recorded a signal processing method of supplying a signal to each of apparatuses having a signal recording function in a signal processing system including a predetermined number of apparatuses having the signal recording function, wherein it is managed so as to permit the recording operation to a predetermined number of apparatuses having said signal recording function.

The above and other objects and features of the present invention will become apparent from the following detailed description and the appended claims with reference to the accompanying drawings.

BRIEF DESCRIPTION OF THE DRAWINGS

FIG. 17 are timing charts for explaining the execution of an operating mode other than a recording system mode.

DETAILED DESCRIPTION OF THE PREFERRED EMBODIMENTS

Figure 1:
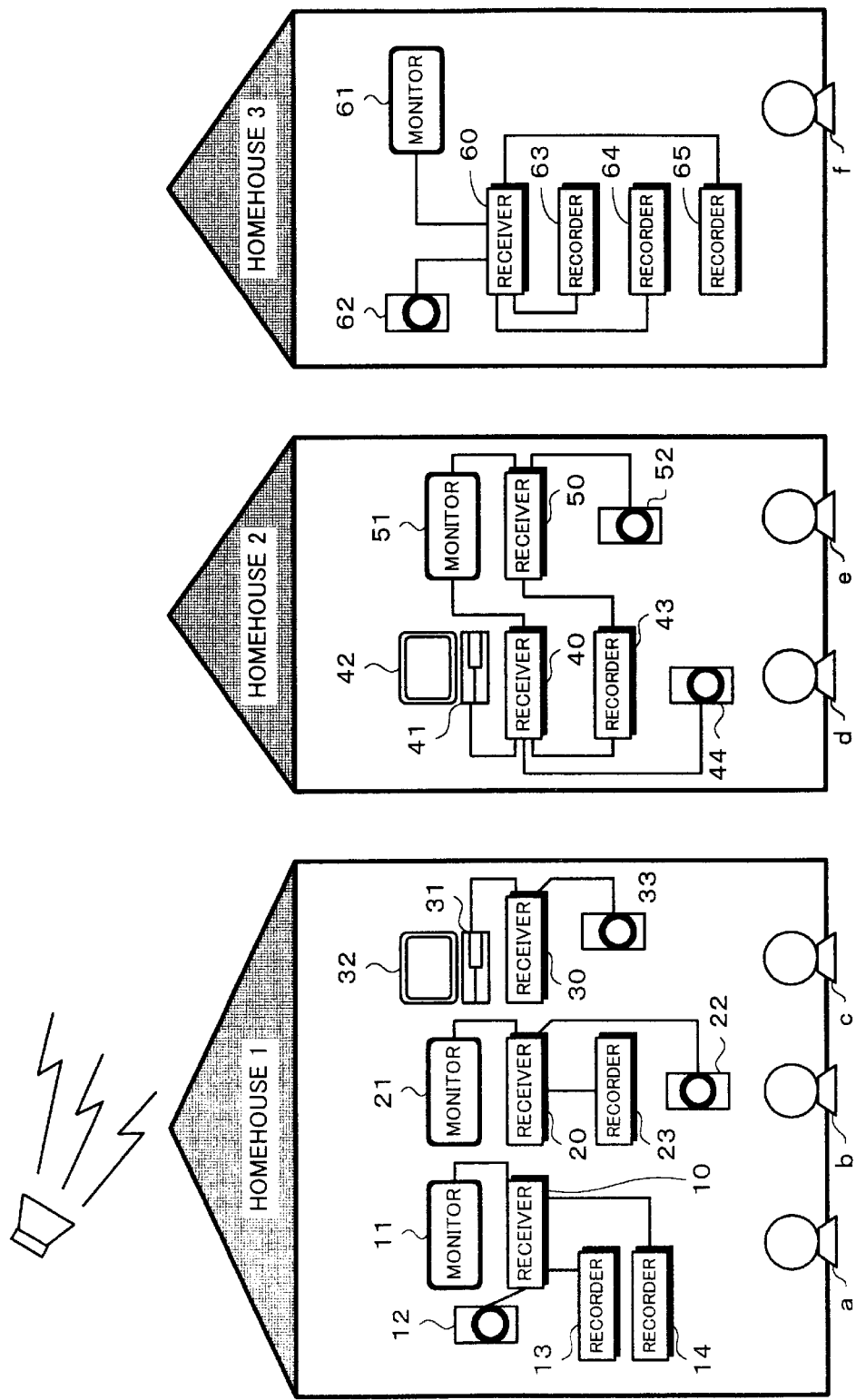
FIG. 1 is a schematic diagram showing an example of a construction of the first embodiment of the invention.

FIG. 1 shows a construction of the first embodiment of the invention. For simplicity of explanation, it is assumed that an apparatus to supply a signal permits the recording of the signal which is outputted from the self apparatus only to one recording apparatus. The invention, however, can be also applied to a case where the number of recorders to which the recording operation is permitted in the same period in a network is limited to 2 or more. According to the first embodiment of the invention, an information network to which an apparatus for receiving a toll information signal such as a satellite broadcasting or the like which is supplied from the outside via a radio wave or the like and performing a display, recording, or the like based on the received information signal is connected is provided in a homehouse. In a homehouse 1, three receivers 10, 20, and 30 are provided. As a receiver 10, for example, an IRD (Integrated Receiver and Decoder), an STB (Set Top Box), or the like for receiving a radio wave of a satellite broadcasting and transmitting the received information signal to an apparatus in the network can be used. For example, a monitor 11 such as a digital television receiver or the like, a speaker 12, and two recorders 13 and 14 are connected to the receiver 10. A monitor 21, a speaker 22, and a recorder 23 are connected to the receiver 20. A video deck 31 having a recording function and a monitor 32 and a speaker 33 associated with the video deck are connected to the receiver 30.

As a form of the toll information signal which is supplied from the outside, besides a radio broadcasting such as a satellite broadcasting or the like, for example, there is a form using a wire broadcasting such as telephone line, various cable television broadcastings, or the like. As a recorder, any recorder can be used so long as it can be connected to a network such as a home-use network or the like including audio/visual apparatuses or the like. Specifically speaking, the invention can be applied to a network including a recorder such as a tape recorder or the like using a tape-shaped recording medium, a recorder using a disk-shaped recording medium such as magnetic disk, magnetooptic disk, write-once type CD (compact disc), or the like, a recorder using a memory card or the like, and the like.

Two receivers 40 and 50 are provided in a homehouse 2. A video deck 41 having a recording function and a monitor 42, a recorder 43, a speaker 44, and a monitor 51 which are associated with the video deck 41 are connected to the receiver 40. The monitor 51, a speaker 52, and the recorder 43 are connected to the receiver 50. A receiver 60 is provided for a homehouse 3. A monitor 61, a speaker 62, and recorders 63, 64, and 65 are connected to the receiver 60. In a toll information providing service, it is a general way to make a contract so that one receiver becomes a target for charging. That is, one viewer (contractor) a, b, c, d, e, or f can monitor the information with respect to each of the receivers 10, 20, 30, 40, 50, and 60.

In the case where such a system that two or more recorders are connected to one receiver when the contents in which the number of copies of an information signal received by one receiver is limited to only one have been specified by a contract or the like is constructed, it is necessary to manage so that only one of the recorders can perform the recording operation. The invention relates to the management of such a recording operation. For example, it is necessary to manage so that while the recording operation is being performed by the recorder 13 (shown by a hatched portion) connected to the receiver 10, the recording operation by the recorder 14 cannot be started. It is, however, impossible to prevent that the recording is performed via the receivers other than the receiver 10, namely, via the recorders 20 and 30. For example, even for a period of time during which the recording operation is being performed by the recorder connected to the receiver 10, the recording can be performed by the recorder 23 connected to the receiver 20 or the video deck 31 having the recording function connected to the receiver 30.

In the homehouse 2, it is managed so that the recorder 43 and the video deck 41 having the recording function cannot simultaneously perform the recording operation for recording an information signal which is supplied from the receiver 40. However, it is impossible to prevent such a situation that for a period of time during which the video deck 41 having the recording function is executing the recording operation for recording the information signal which is supplied from the receiver 40, the recorder 43 executes the recording operation for recording the information signal which is supplied from the receiver 50. Further, in the homehouse 3, although the three recorders 63, 64, and 65 are connected to the receiver 60, it is managed so that the recording operations by the recorders 64 and 65 cannot be started for a period of time during which the recorder 63 (shown by a hatched portion) is executing the recording operation.

Even while one recorder is performing the recording operation, such a situation that the other recorder executes the operation other than the recording operation cannot be prevented. For example, in the network of the homehouse 3, such an operation that the recorders 64 and 65 use an output signal of the receiver 60 for the purpose other than the recording irrespective of whether the recorder 63 is recording the output signal of the receiver 60 or not can be performed so long as an authentication in which the recorders 64 and 65 are the apparatuses connected to the receiver 60 is valid. For example, in the case where the monitors, speakers, and the like are connected to the recorders 64 and 65, the transmitted information signal can be always monitored via those apparatuses. In the case where a request indicating that, for example, the recorder 64 wants to record after completion of the recording operation by the recorder 63 is issued, a right to record is transferred to the recorder 64 (which will be explained hereinlater).

Figure 2:
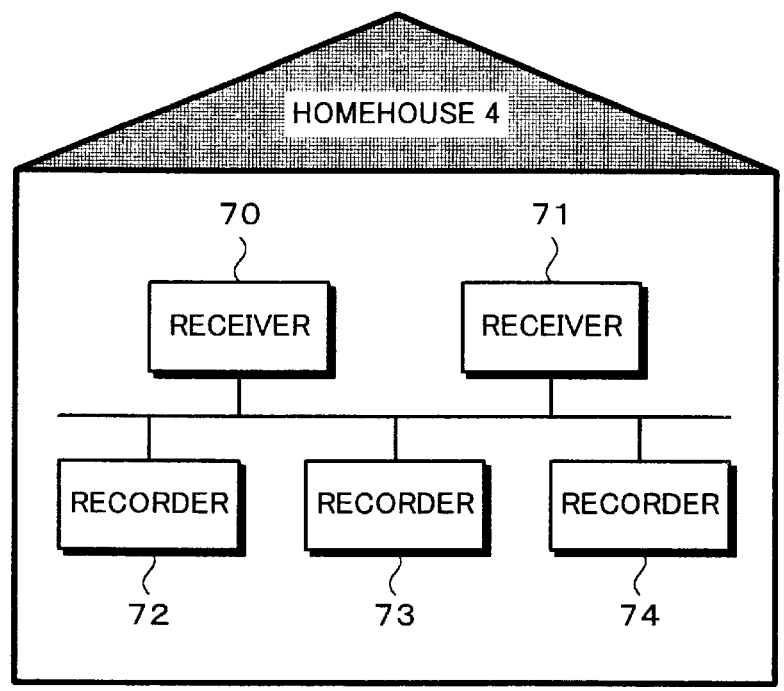
FIG. 2 is a schematic diagram showing an example of a construction of the second embodiment of the invention.

The second embodiment of the invention will now be described with reference to FIG. 2. In a homehouse 4, two receivers 70 and 71 and three recorders 72, 73, and 74 are connected to the same network. More specifically, a construction in which the IRD or STB is used as receivers 70 and 71 or the like can be used. In such a network construction, it is controlled so that the operation in which one receiver records a signal which is transmitted into the network is permitted only to the recorders of a predetermined number (for example, one or the like).

For instance, for a period of time during which the receiver 70 permits the recording to the recorder 72, the operation in which the recorder 73 records the signal which is transmitted from the receiver 70 into the network is not permitted. For a period of time during which the receiver 71 permits the recording to the recorder 72, the operation in which the recorder 73 records the signal which is transmitted from the receiver 71 into the network is not permitted. However, for a period of time during which the receiver 70 permits the recording to the recorder 72, the operation in which the recorder 73 records the signal which is transmitted from the receiver 71 into the network can be permitted. Also in the case where three or more receivers are provided in the same network, those recording operations are similarly controlled.

Figure 3:
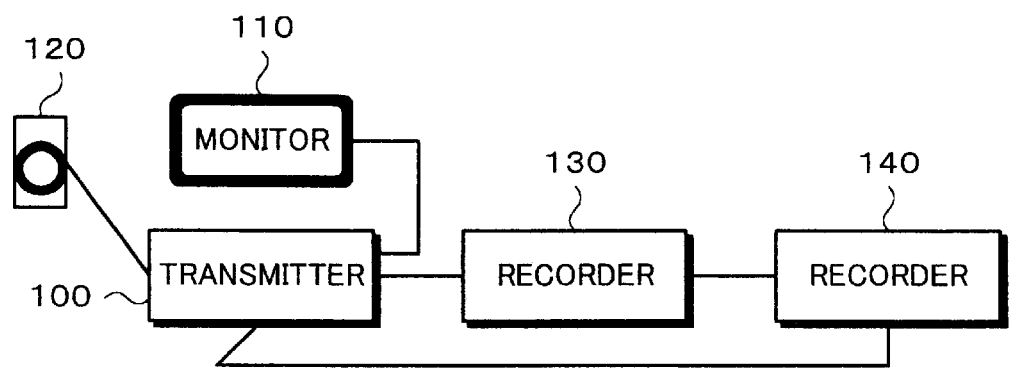
FIG. 3 is a schematic diagram showing an example of a construction of the third embodiment of the invention.

The third embodiment of the invention will now be described. FIG. 3 shows a construction of an example of a network in home according to the third embodiment of the invention. A transmitter 100 transmits an information signal which is supplied via a radio wave or the like from the outside to each apparatus in a system. The transmitter 100 can be, for example, an IRD, an STB, or the like integratedly having a receiver for receiving the radio wave or the like or can be a receiver constructed in such a manner that a some process is performed to an information signal received by a receiver provided separately and the processed signal is transmitted.

A monitor 110, a speaker 120, and recorders 130 and 140 such as VTRs (Video Tape Recorders) or the like are provided in the network. In this example, the recorder 130 (shown by a hatched portion) is recording an output signal of the transmitter 100. The transmitter 100 recognizes that the operation to record the output signal which is transmitted from the self apparatus is permitted to the recorder. A process regarding the start of permission can be a process for allowing the transmitter 100 to control the recorder so as to enter the recording mode or a process for accepting a recording operation request from the recorder. A process regarding the end of permission can be a process for allowing the transmitter 100 to control the recorder so as to enter the recording stop mode, a process in which the transmitter 100 confirms the operating mode of the recorder, thereby detecting that the recorder is in the recording stop mode, or a process in which the transmitter 100 receives a notification indicative of the recording stop mode from the recorder, thereby detecting that the recorder is in the recording stop mode. There can be a case where the transmitter 100 recognizes that which recorder is executing the recording or does not recognize it in accordance with a system construction or the like. In any case, the invention can be applied.

In such a situation, when a request indicating that the recorder wants to record is issued from the recorder 140 which is not performing the recording operation, the transmitter 100 does not permit the recording regarding such a request. As processes in which the recording is not permitted, specifically speaking, the following processes can be mentioned: that is, (1) a process for restricting the recording operation; (2) a process in which the transmitter 100 does not give data serving as a key for decrypting an encryption applied to the output signal, thereby disabling the recorded data to be correctly reproduced even if the recorder forcedly performs the recording operation; (3) a process in which the transmitter 100 does not supply a correct signal to the recorder; and the like. For a period of time during which the transmitter 100 permits the recording of the self output signal to the recorder 130, even if a recording request is received from the recorder 140, the recording is not permitted.

Figure 4:
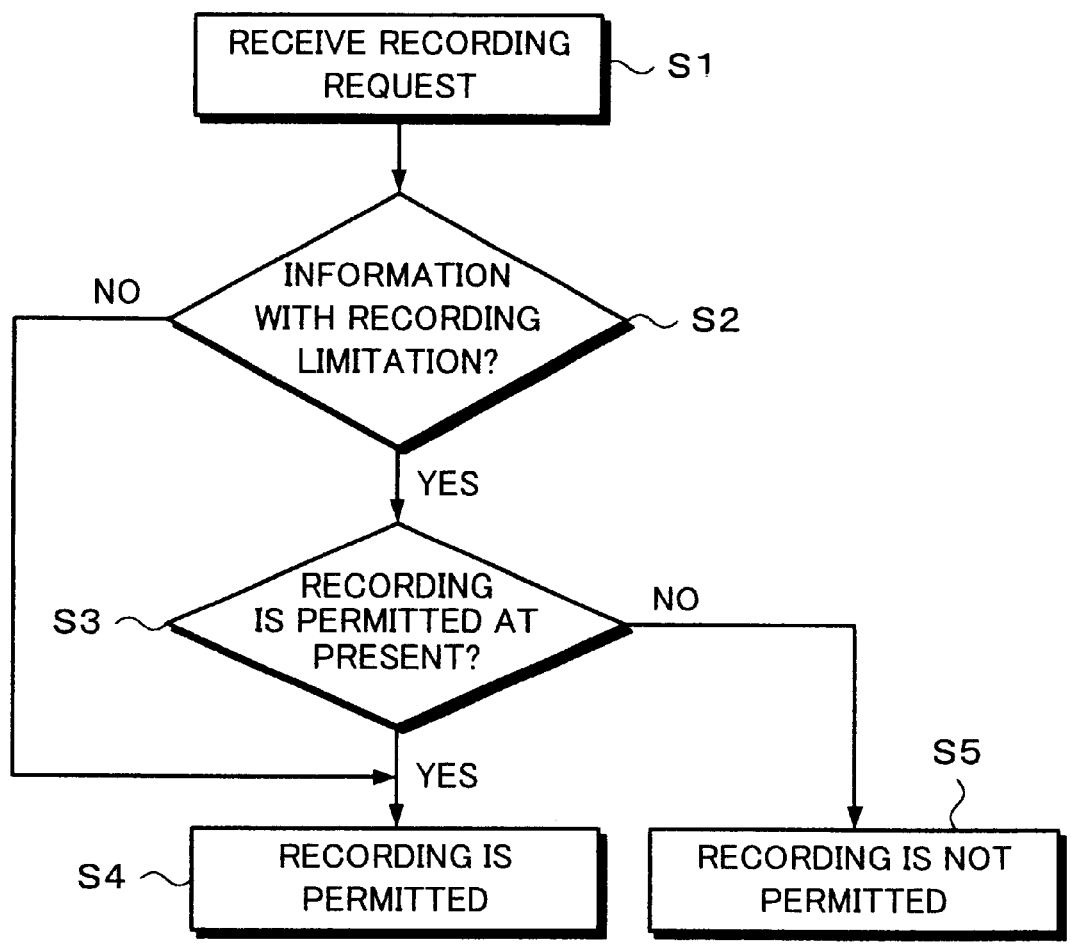
FIG. 4 is a flowchart showing an example of a part of processes in the third embodiment of the invention.

An example of the processes in this case is shown in FIG. 4. The recording request is received in step S1. Explanation will now be made with respect to a case where the recording request is as shown in the following (a).

(a) Recording request which indicates that the recorder wants to record the channel which has been set at present in the transmitter in a real-time manner and includes the designation of an ID of the transmitter.

In step S2, the presence or absence of a recording limitation in the output information is discriminated. When it is determined that there is no recording limitation, step S4 follows. When it is determined that there is the recording limitation, step S3 follows. In step S3, whether the recording is permitted to any of the apparatuses in the network at present or not is discriminated. When it is determined that the recording is permitted, step S5 follows. In the other cases, step S4 follows. In step S4, the recording is permitted to the recorder which issued the recording request regarding step S1. In step S5, since the recording is permitted at present to any of the apparatuses in the network, the recording is not permitted to the recorder which issued the recording request regarding step S1. By the processing procedure as mentioned above, such a situation that a plurality of recorders in the network simultaneously record the information subjected to the recording limitation is prevented.

Figure 5:
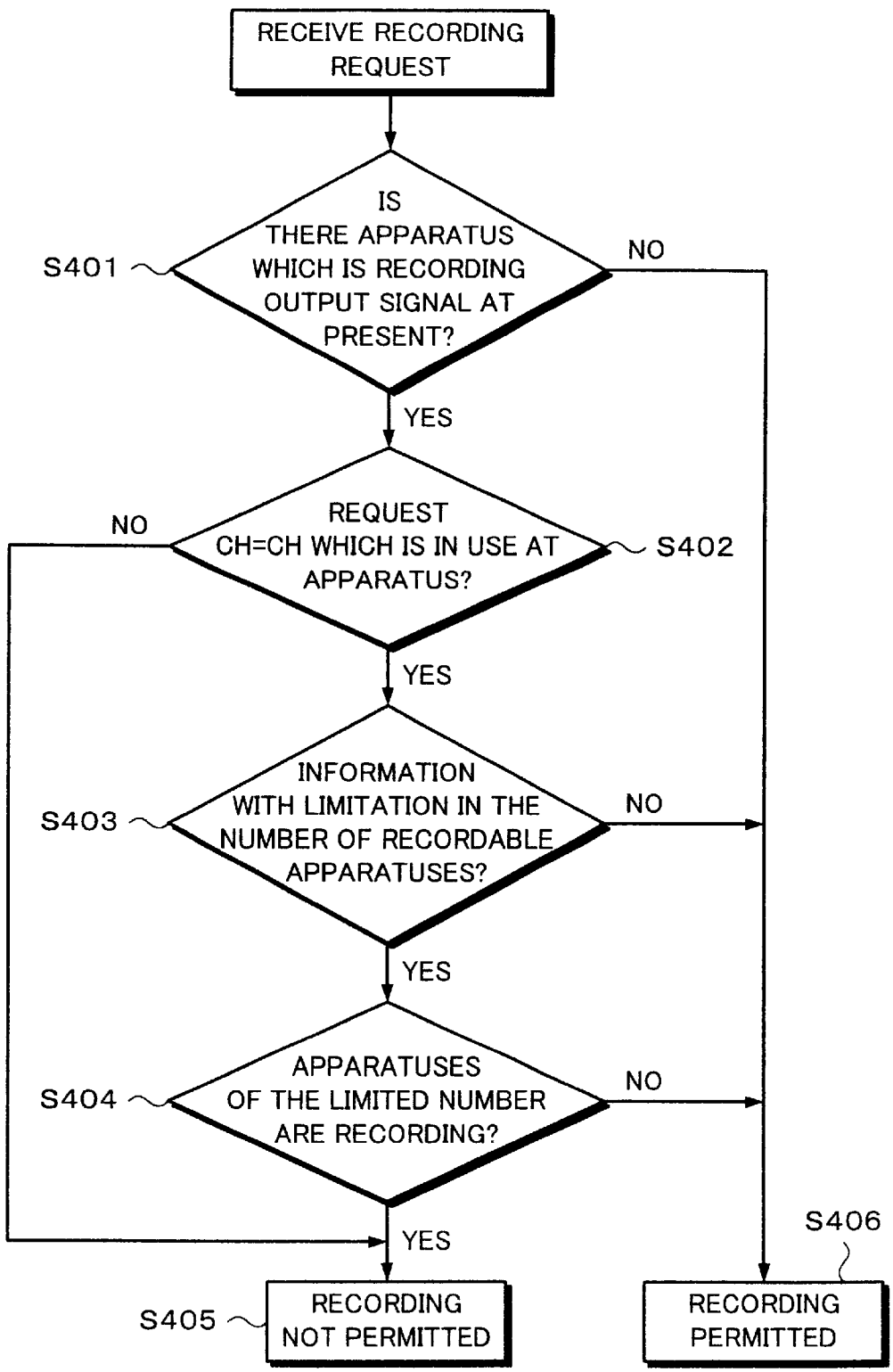
FIG. 5 is a flowchart showing another example of a part of processes in the third embodiment of the invention.

Processes in the case where it is presumed that the recording request is as shown in the following (b) will now be described with reference to FIG. 5.

(b) Recording request which indicates that the recorder wants to perform the real-time recording and includes a designation of the transmitter ID and a designation of a set channel.

In step 401, whether there is an apparatus which is at present recording the output signal or not is discriminated. When it is decided that there is the apparatus which is at present recording the output signal, the processing routine advances to step S402. In the other cases, step S406 follows. In step S402, whether the channel regarding the recording request is the same as the channel that is at present being used or not is discriminated. When it is decided that the channel regarding the recording request is the same as the channel that is at present being used, step S403 follows. In the other cases, step S405 follows. In step S403, whether the information is information in which the limitation of the number of apparatuses which can record has been set or not is discriminated. If the information is determined to be the information in which the limitation of the number of apparatuses which can record has been set, step S404 follows. In the other cases, step S406 follows. In step S404, whether the apparatuses of the number corresponding to the limited number regarding step S403 are recording or not is discriminated. If it is determined that the apparatuses of the number corresponding to the limited number are recording, step S405 follows. In the other cases, step S406 follows. In step S405, it is determined not to permit the recording. In step S406, it is decided to permit the recording.

Figure 6:
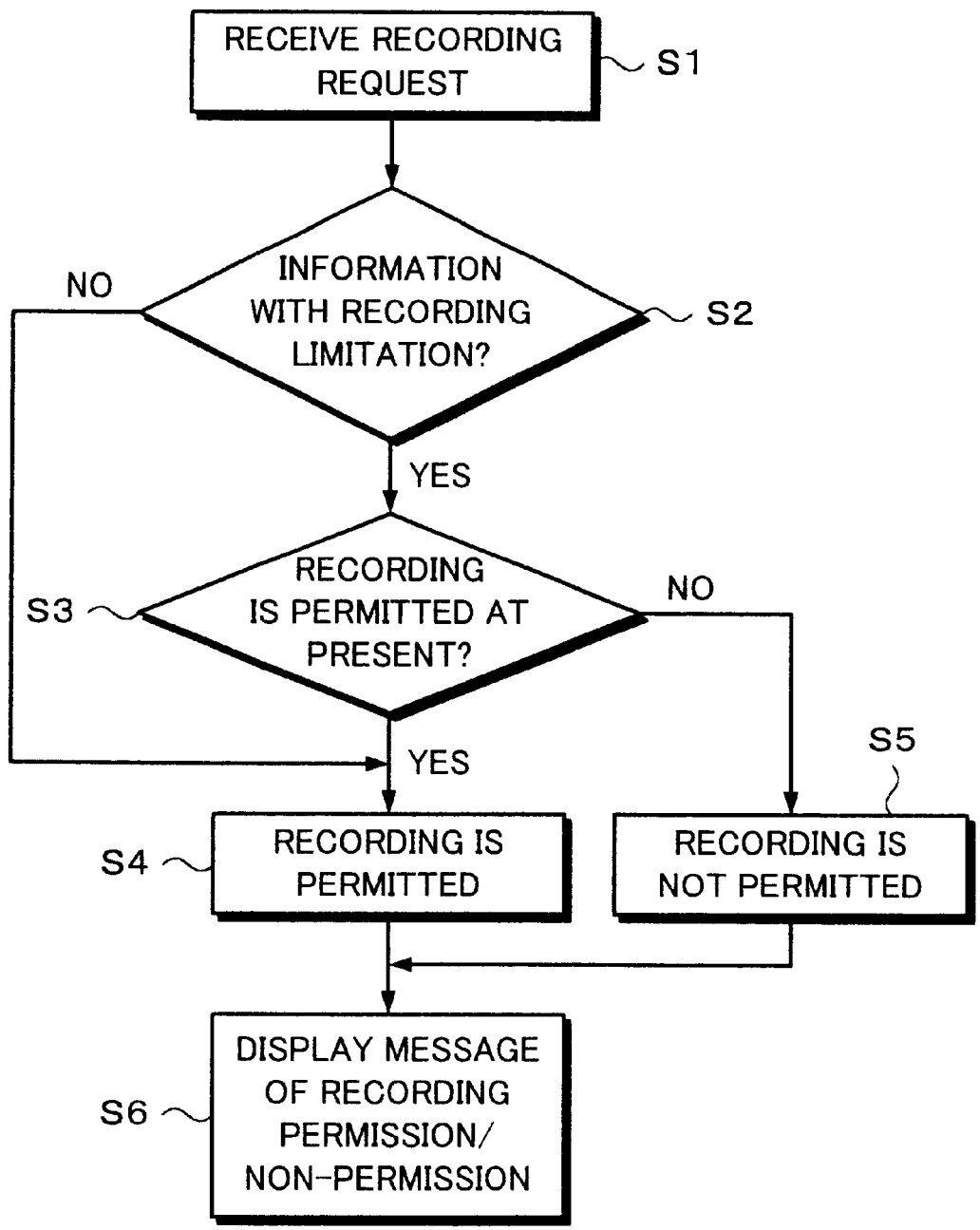
FIG. 6 is a flowchart showing further another example of a part of processes in the third embodiment of the invention.

A message about permission/non-permission of the recording can be further displayed. That is, as shown in a flowchart of FIG. 6, the processing routine can advance to step S5 after step S3 or S4 is executed. A case where it is presumed that the recording request is as shown in (a) mentioned above will now be described.

For example, in step S5, a message about permission/non-permission of the recording can be displayed by a display unit or the like on an operation panel of the recorder which issued the recording request. It is also possible to construct the apparatus in such a manner that an image display in the network, for example, a television receiver or the like is set as a display unit so as to display the operating status of each apparatus including the recorder in the network and the message about permission/non-permission of the recording is displayed by such a display unit.

Figure 7:
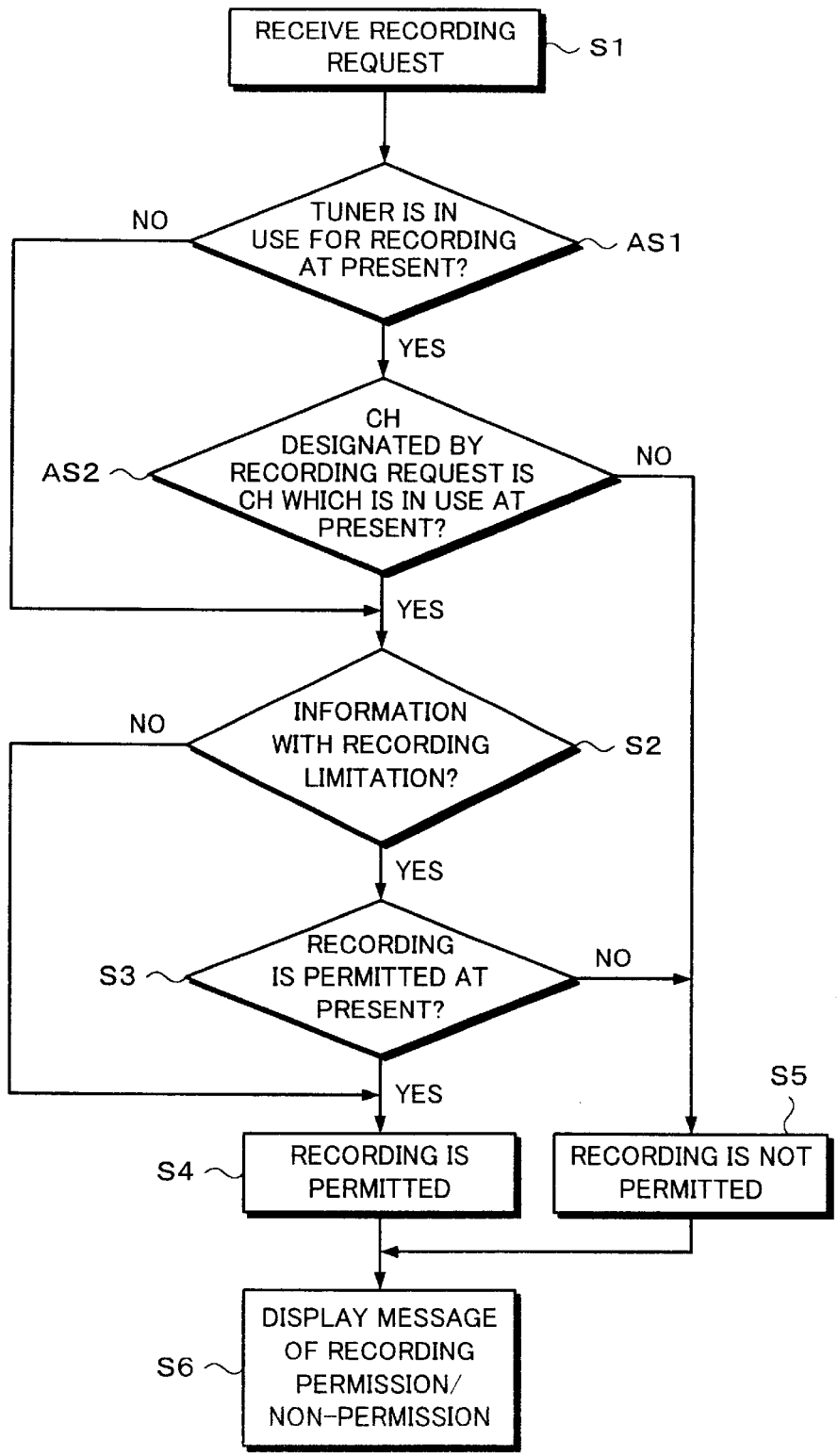
FIG. 7 is a flowchart showing still another example of a part of processes in the third embodiment of the invention.

Processes in the case where it is presumed that the recording request is as shown in (b) mentioned above will now be described with reference to FIG. 7. In FIG. 7, since the process in each of steps S1, S2, S3, S4, S5, and S6 is similar to that in the step designated by the same step number in FIGS. 4 and 6, its overlap description is omitted. When the recording request is received in step S1, the processing routine advances to step AS1. In step AS1, whether a tuner in a transmitter is being used at present in order to transmit the signal regarding the recording operation or not is discriminated. When it is determined that the tuner is being used, step AS2 follows. In the other cases, step S2 follows. In step AS2, whether the channel which is designated by the recording request is the channel which is at present being used or not is discriminated. If it is determined that the channel which is designated by the recording request is the channel which is at present being used, step S2 follows. In the other cases, step S5 follows.

Not only by displaying the message about permission/non-permission of the recording but also by displaying a message indicating "Since the other recorder is recording at present, the recording cannot be performed.", a use efficiency for the user can be raised. In the case where the recording is not permitted before a certain time point but the recording is permitted after the certain time point, a message indicating "The recording is permitted." can be displayed at the certain time point. In the case where the recording is permitted, since it will be obviously understood that the recording operation responsive to the recording request is realized, it is considered that the necessity of displaying the message indicating "The recording is permitted." is generally small. In consideration of such circumstances, it is also possible not to display the message indicating the permission/non-permission of the recording when the recording is permitted.

Figure 8:
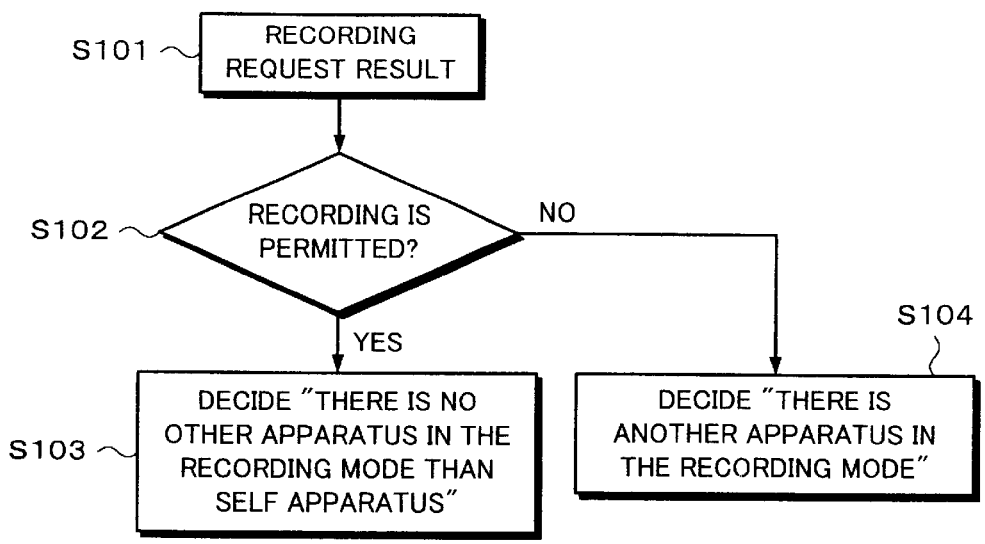
FIG. 8 is a flowchart showing an example of another part of processes in the third embodiment of the invention.

By the processes as mentioned above with reference to FIGS. 4 to 7, when the recording is not permitted in response to the request indicating that the recorder wants to record, the recorder 140 can recognize that the recorder other than the self recorder is executing the recording operation. An example of such a process will now be described with reference to FIG. 8. That is, even if the recorder 140 does not directly communicate with the other recorder (in this case, the recorder 130), it can recognize that the other recorder 130 in the network is executing the recording operation. In FIG. 8, whether the recording operation responsive to the result of the recording request made in step S101 has been permitted or not is discriminated in step S102.

When the recording operation is permitted, step S103 follows. In the other cases, step S104 follows. In step S103, whether "There is no other apparatus in the recording mode than self apparatus in the network." or not is discriminated. In step S104, whether "There is another apparatus in the recording mode except for the self apparatus in the network." or not is discriminated. By the above processes, the recorder 140 can recognize that the recorder other than the self recorder is executing the recording operation. In this case, however, the recorder 140 cannot recognize which recorder is executing the recording operation.

Another example of the process which is executed by the recorder 140 in the case where the recording is not permitted in response to the request indicating that the recorder wants to record will now be described with reference to FIG. 9. In this example, the recorder 130 notifies the transmitter 100 of a message indicating that the self recorder is executing the recording operation together with the ID number of the self recorder in the network. When the recorder 140 issues the message indicating that it wants to record for a period of time during which such a notification is made, the transmitter 100 can inhibit the operation according to such a request and notify the recorder 140 of the message indicating that the recorder 130 is executing the recording operation. Specifically speaking, there is a method whereby the transmitter 100 notifies the recorder 140 of the fact that the recorder under the recording operation exists in the network and the ID number of the recorder 130 under the recording operation, or the like. In this case, the recorder 140 can recognize that the recorder 130 is executing the recording operation.

Figure 9:
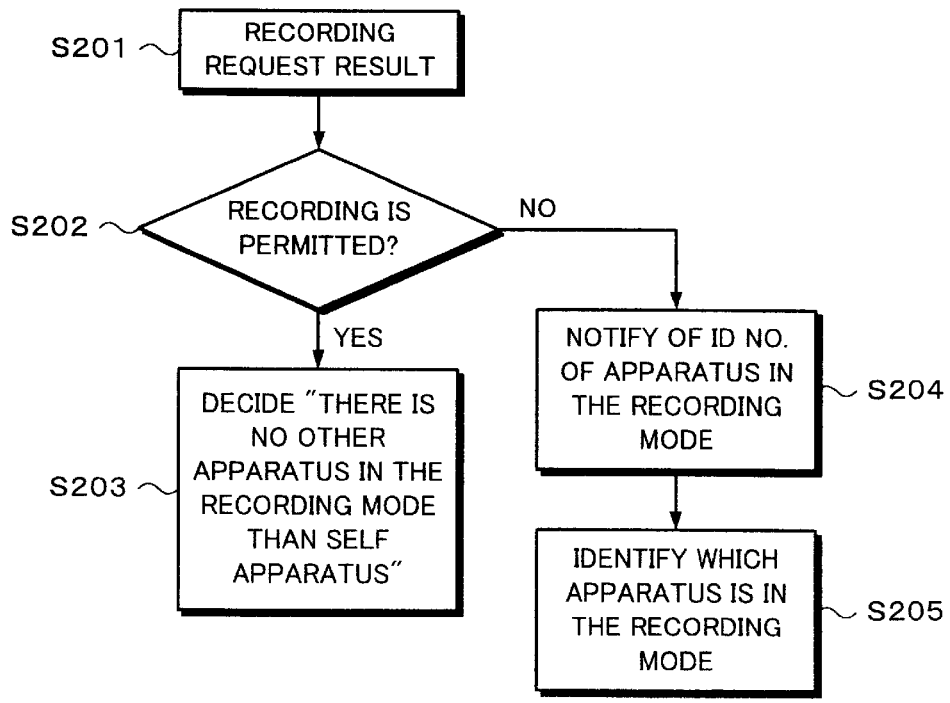
FIG. 9 is a flowchart showing another example of another part of processes in the third embodiment of the invention.

In FIG. 9, whether the recording operation according to the result of the recording request made in step S201 has been permitted or not is discriminated in step S202. When the recording operation is permitted, step S203 follows. In the other cases, step S204 follows. In step S203, whether "There is no other apparatus in the recording mode than self apparatus." or not is discriminated. In step S204, the ID number of the apparatus under the recording operation is notified. On the basis of the ID number, which apparatus is in the recording mode is discriminated in step S205.

Figure 10:
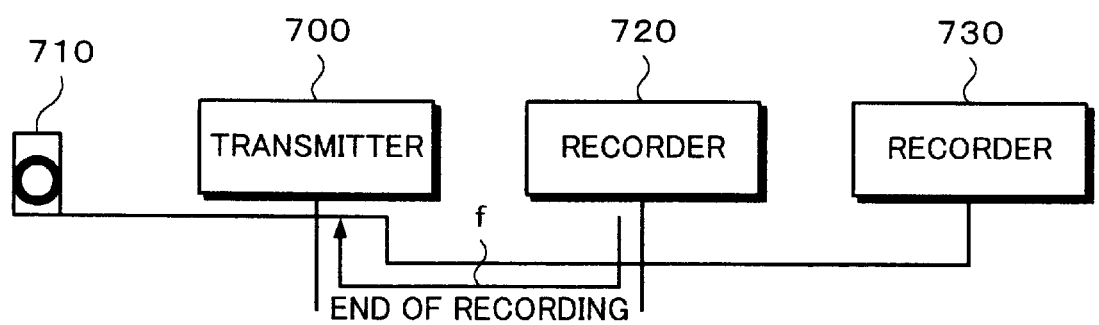
FIG. 10 is a schematic diagram showing an example of a construction of the fourth embodiment of the invention.

The fourth embodiment of the invention will now be described. FIG. 10 shows an example of a system comprising a transmitter 700, a speaker 710, and recorders 720 and 730. In the case where the recorder 720 is continuously performing the recording operation from a certain past time point, as mentioned above, even if the recorder 730 issues a request indicating that it wants to execute the recording operation, the recording operation regarding the request is not permitted. In the fourth embodiment of the invention, at a point after the point when the recorder (in FIG. 10, the recorder 720) which had been performing the recording in a certain period of time finished the recording operation, the right for recording is automatically transferred to the other recorder (in FIG. 10, the recorder 730). Such a control is realized by a method whereby, for example, in association with the control in which the recording operation of the recorder 720 is finished when signals indicative of the permission/inhibition of the recording for the recorder 720 are switched from, for example, the "H" (high) level indicative of the permission to the "L" (low) level indicative of the inhibition, signals indicative of the permission/inhibition of the recording for the recorder 730 are switched from, for example, the "L" level indicative of the inhibition to the "H" level indicative of the permission, thereby starting the recording operation of the recorder 730.

Figure 11:
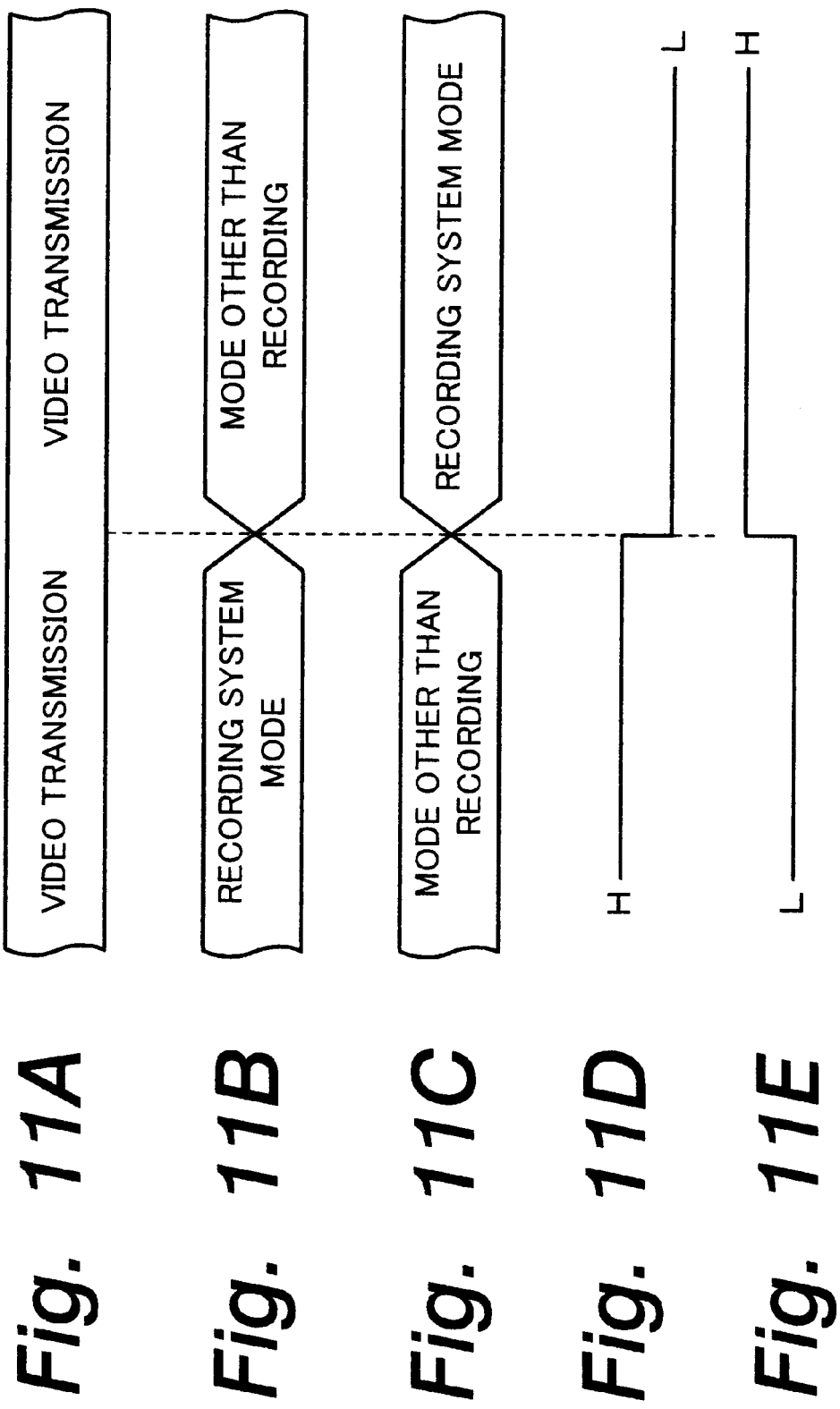
FIG. 11 are timing charts showing an example of a processing timing in the fourth embodiment of the invention.

FIGS. 11A to 11E show an example of an operation timing in the fourth embodiment of the invention. As shown in FIG. 11A, the transmitter 700 transmits a video signal as an information signal. FIGS. 11B and 11C show examples of the operating modes of the recorders 720 and 730. FIGS. 11D and 11E show examples of the signals indicative of the permission/inhibition of the recording for the recorders 720 and 730. When the operating mode of the recorder 720 is switched from the recording system mode to an operating mode such as a stop mode or the like other than the recording mode at a timing as shown in FIG. 11B, the operating mode of the recorder 730 is switched from the operating mode such as a stop mode or the like other than the recording mode to the recording system mode at a timing as shown in FIG. 11C.

In response to the switching of the operating mode as mentioned above, the signals indicative of the permission/inhibition of the recording for the recorder 720 are switched from the "H" level indicative of the permission to the "L" level indicative of the inhibition and the signals indicative of the permission/inhibition of the recording for the recorder 730 are switched from the "L" level indicative of the inhibition to the "H" level indicative of the permission. By the control as mentioned above, the right for recording is transferred from the recorder 720 to the recorder 730. By providing a construction in which the buffering is properly performed when the information signal to be recorded by the recorder 730 is supplied, it is possible to prevent the information signal which is recorded by the recorders 720 and 730 from being interrupted.

In this case, the buffering can be performed by a software process. Specifically speaking, there are the following processes: namely, a process in which when the recorder 720 enters a mode other than the recording mode at a change point in FIG. 11B, the transmitter 700 notifies the recorder 730 of the permission of the recording or instructs the start of the recording; a process in which the transmitter 700 encrypts the output signal, previously transmits different keys to the recorders 720 and 730, and the key for decryption transmitted to the recorder 720 is switched to the key for decryption transmitted to the recorder 730 at the change point; and the like.

FIGS. 11A to 11E show the case where simultaneously with that the recorder 720 is switched from the recording system mode to the operating mode other than the recording mode, the recorder 730 is switched from the operating mode other than the recording mode to the recording system mode. However, it is also possible to use a method whereby after the recorder 720 was switched to the operating mode other than the recording mode, the recorder 730 is switched to the recording system mode after the elapse of a certain time.

Figure 12:
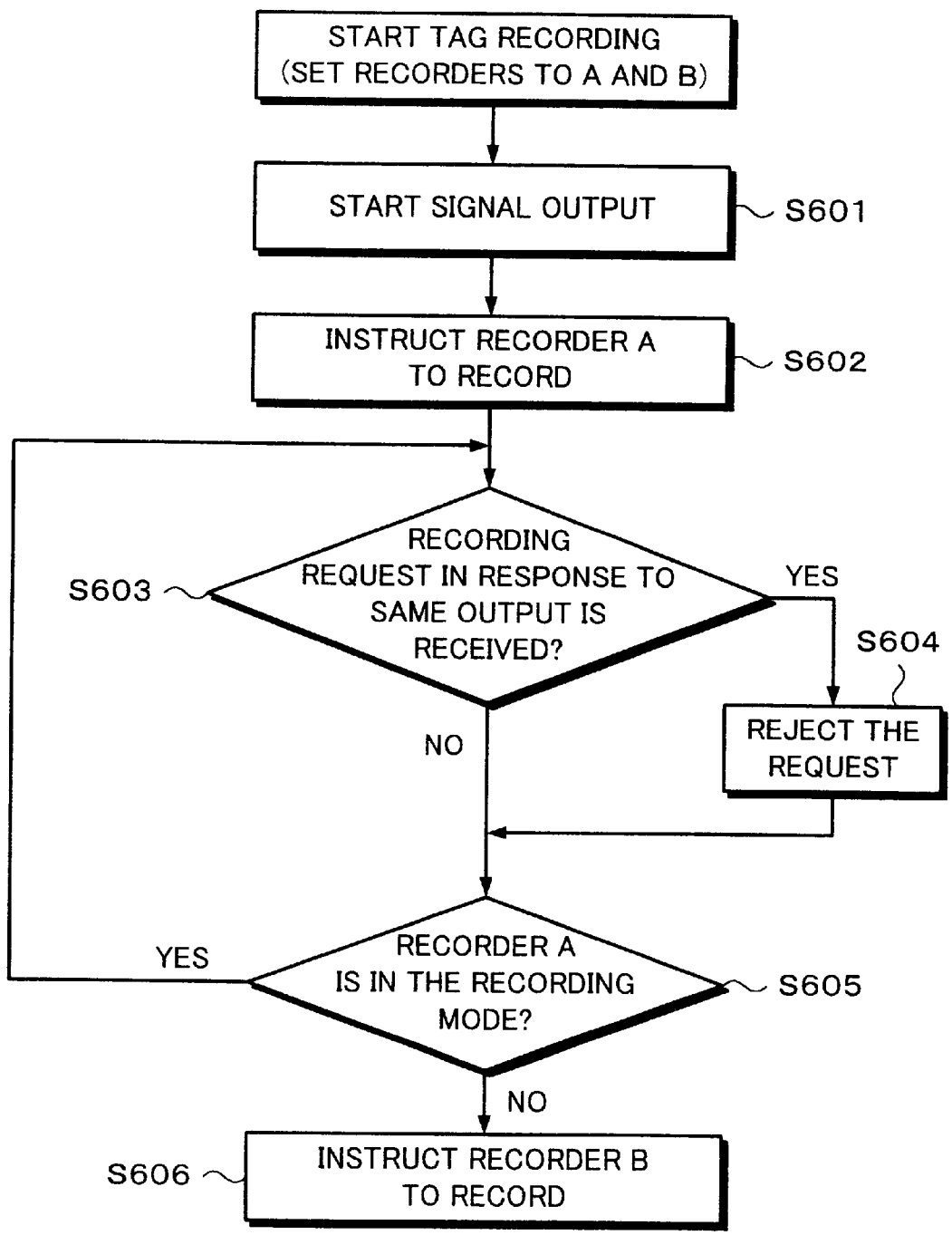
FIG. 12 is a flow chart showing an example of the process procedure of performing tag-recording process.

FIG. 12 shows an example of a processing procedure for realizing a process (what is called a tag-recording process) according to the timing chart as shown in FIGS. 11A to 11E. The recorders regarding the process are assumed to be represented by A and B. The signal output is started in step S601. The recording is instructed to the recorder A in step S602. In step S603, whether the recording request issued from the other recorder such as a recorder B or the like has been received in response to the same signal output as the signal output which is being recorded by the recorder A in response to the recording instruction in step S602 or not is discriminated. When it is determined that the recording request has been received, step S604 follows. In the other cases, step S605 follows. In step S604, a process for rejecting the recording request is performed. After that, step S605 follows. In step S605, whether the recorder A is in the recording mode or not is discriminated. When it is decided that the recorder A is in the recording mode, step S603 follows. In the other cases, step S606 follows. In step S606, the recording is instructed to the recorder B.

The fifth embodiment of the invention will now be described. According to the fifth embodiment of the invention, for example, in the construction shown in FIG. 10, for instance, one recorder (in FIG. 10, the recorder 720) among a predetermined number of recorders is continuously performing the recording operation from a certain past time point, it is possible to reserve in such a manner that the recorder (in FIG. 10, the recorder 730) which does not have the right for recording executes the recording after the point when the recorder (in FIG. 10, the recorder 720) which is at present performing the recording operation finishes the recording operation. This reservation can be made either on the basis of the request by the recorder or on the basis of the setting by the user to the transmitter, or the like.

Figure 13:
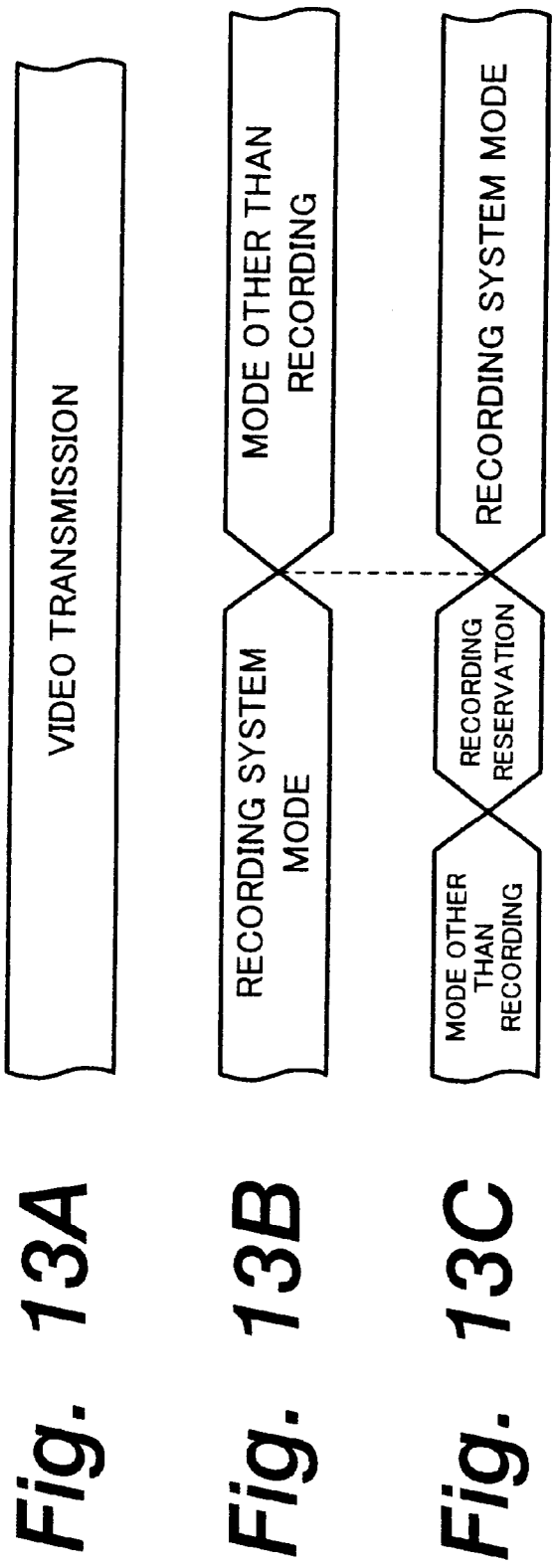
FIG. 13 are timing charts showing examples of a processing timing in the fifth embodiment of the invention.

FIGS. 13A to 13C show an example of an operation timing in the fifth embodiment of the invention. A network construction is assumed to be identical to that in the fourth embodiment of the invention shown in FIG. 10. As shown in FIG. 13A, the transmitter 700 transmits a video signal as an information signal. FIGS. 13B and 13C show examples of the operation timings of the recorders 720 and 730, respectively. Although the recorder 730 does not have the right for recording for a period of time during which the recorder 720 is in the recording system mode, the recorder 730 can be set to a recording reserving mode in a period of time during which the recorder 720 is in the recording system mode.

The recording reserving mode is a mode in which when the recorder (the recorder 720 here) which is at present in the recording system mode finishes the recording system mode, a point that the right for recording is transferred to the self recorder is insisted in the network. Thus, when the recorder 720 finishes the recording system mode, the recorder 730 in the recording reserving mode starts the recording system mode. Although the signals indicative of the permission/inhibition of the recording for the recorders 720 and 730 are not shown in FIGS. 13A to 13C, they are switched in correspondence to the start/end of the recording system mode in a manner similar to that in the fourth embodiment of the invention described with reference to FIGS. 11A to 11E.

Figure 14:
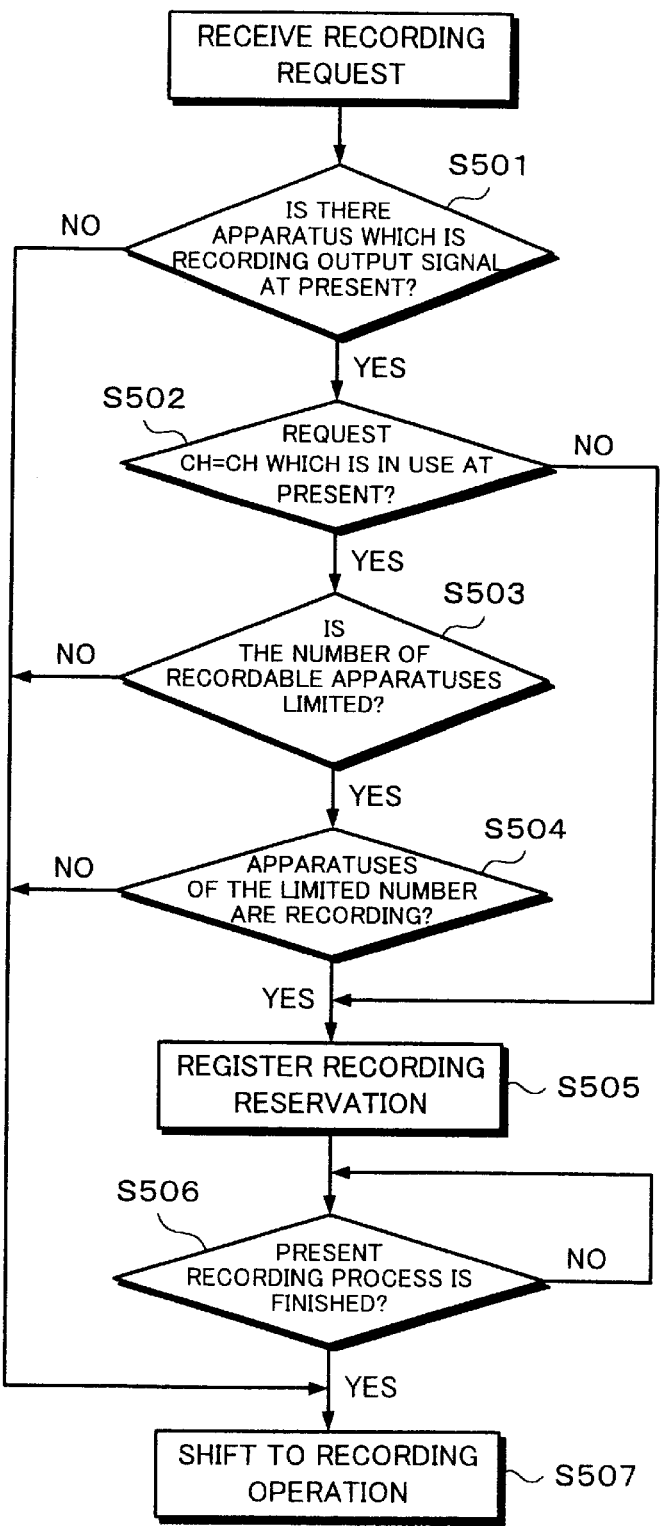
FIG. 14 is a flow chart showing an example of the process procedure in the fifth embodiment of the invention.

FIG. 14 shows an example of a processing procedure for realizing processes according to the timing chart as shown in FIGS. 13A to 13C. In step S501, the presence or absence of the recorder which is at present recording the output signal is discriminated. When it is determined that there is the recorder which is at present recording the output signal, step S502 follows. In the other cases, step S507 follows. In step S502, whether the channel regarding the recording request is identical to the channel which is at present being used or not is discriminated. When it is determined that the channel regarding the recording request is identical to the channel which is at present being used, step S503 follows. In the other cases, step S505 follows. In step S503, whether the number of apparatuses which can record has been limited or not is discriminated. If it is decided that the number of apparatuses which can record has been limited, step S504 follows. In the other cases, step S507 follows. In step S504, whether the apparatuses of the number as many as the limited number in step S503 are now recording or not is discriminated. When it is determined that the apparatuses of the limited number are now recording, step S505 follows. In the other cases, step S507 follows. In step S505, the recording reservation is registered. Further, step S506 follows. In step S506, whether the present recording process has been finished or not is discriminated. When it is decided that the present recording process has been finished, step S507 follows. In the other cases, step S506 follows. In step S507, a process for shifting the operating mode to the recording operation is performed.

The sixth embodiment of the invention will now be described. Generally, an ID number has been set to each apparatus in the network. The transmitter or the like can recognize the operating situation of each apparatus on the basis of the ID number. When a topology changes by an addition, a removal, or the like of an apparatus to/from the network, there is a case where a change occurs in the ID number of each apparatus in the network. As an ID number of each apparatus in the network, for example, there is Node-ID of IEEE1394 or the like. In such a case, if there is a change in topology, the transmitter cannot know to which recorder the recording has been permitted. Therefore, the apparatus which obtained the recording permission notifies the transmitter of the own ID number after the change in topology, thereby enabling the recorder to promptly permit the recording again. In case of IEEE1394, the side which receives an Isochronous signal can easily know a Node-ID of the transmitter with reference to a value of a Source Node-ID field in the packet. Therefore, even if Node-ID of the transmitter changes due to the topology change, the recorder can easily recognize a sending destination of the own ID number.

In such a case, in the sixth embodiment of the invention, the recorder 720 notifies the transmitter 700 of continuation of the recording operation together with the new ID number. In correspondence to it, for example, if the recording is again permitted to the transmitter 700 so as to generate the subsequent signal before the buffer in the recorder 720 becomes empty, the recording operation can be continued without interrupting the information signal during the recording. More specifically speaking, the following management can be performed. That is, when the construction of the apparatuses in the network changes, it is assumed that the apparatus which was recording before such a change can first request the continuation of the operation. After that, if the apparatus which was recording before the change does not request the continuation of the operation until the elapse of a predetermined period of time, it is assumed that the recording request by the other apparatus in the network can be permitted.

Figure 15:
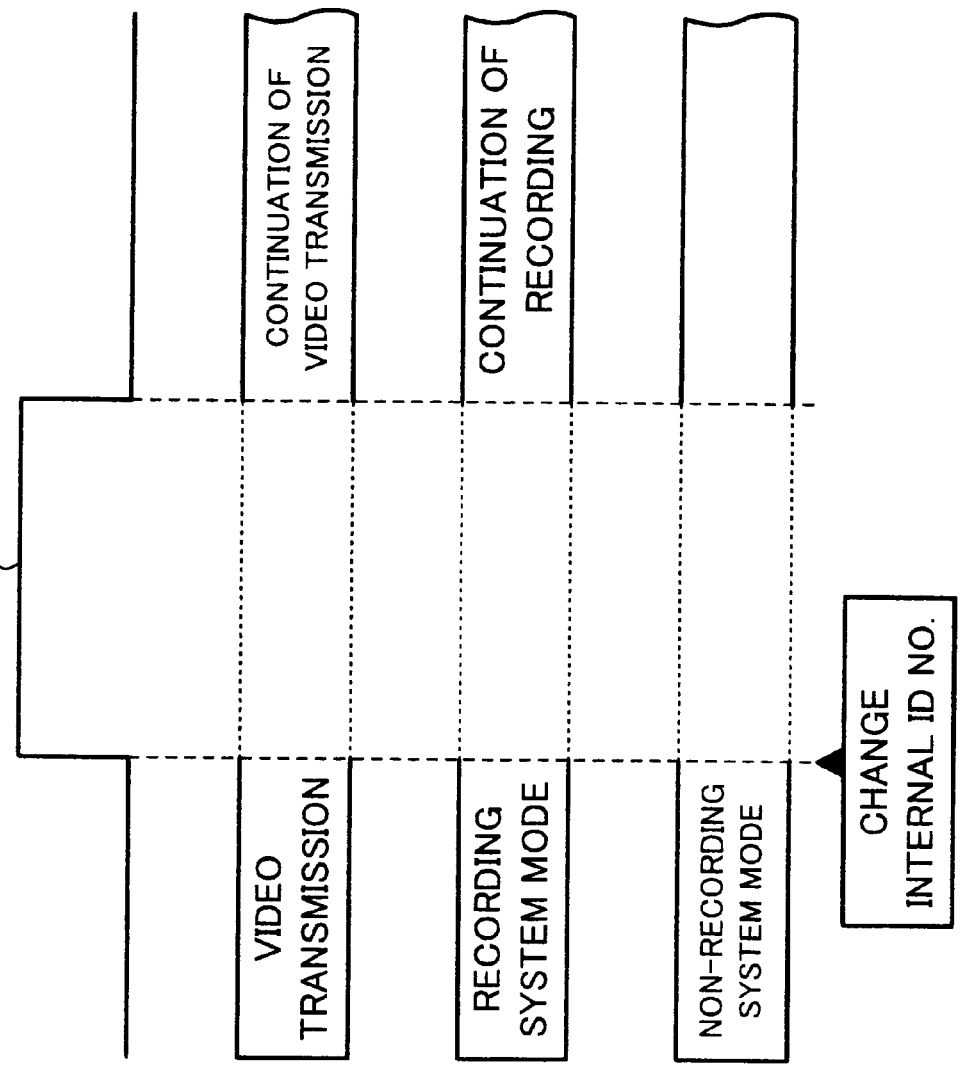
FIG. 15 are timing charts showing an example of a processing timing in the sixth embodiment of the invention.

FIGS. 15A to 15D show an example of processing timings regarding such a management. FIG. 15A shows a period of time during which the continuation of the recording system mode can be requested. That is, only for a predetermined period of time Tw from a point when the construction of the apparatuses in the network changes and the internal ID numbers change, a signal indicative of a period of time during which the continuation of the recording system mode can be requested is set to, for example, the "H" (high) level. If the recorder 720 which was recording before those changes reports the continuation of the recording operation within the period of time Tw, the transmission to the recorder 720 of the video signal as an information signal to be recorded is continued. The operation in which the recorder 720 executes the recording system mode is also subsequently permitted (refer to FIGS. 15B and 15C). If all of the recorders have a mechanism for measuring only for the period of time Tw from the timing of the topology change irrespective of whether the recorder is recording or not, the apparatus which is not recording before the topology change autonomously restricts the recording request for the period of time Tw, thereby making it possible to guarantee the recording of the apparatus which was recording at the time of the topology change.

Generally, with respect to the modes other than the recording mode, the process for continuing the operation is not performed after the point when the internal ID number changes (refer to FIG. 15D). However, as for the modes other than the recording mode, the process for continuing the operation can be also performed after the point when the internal ID number changes.

Figure 16:
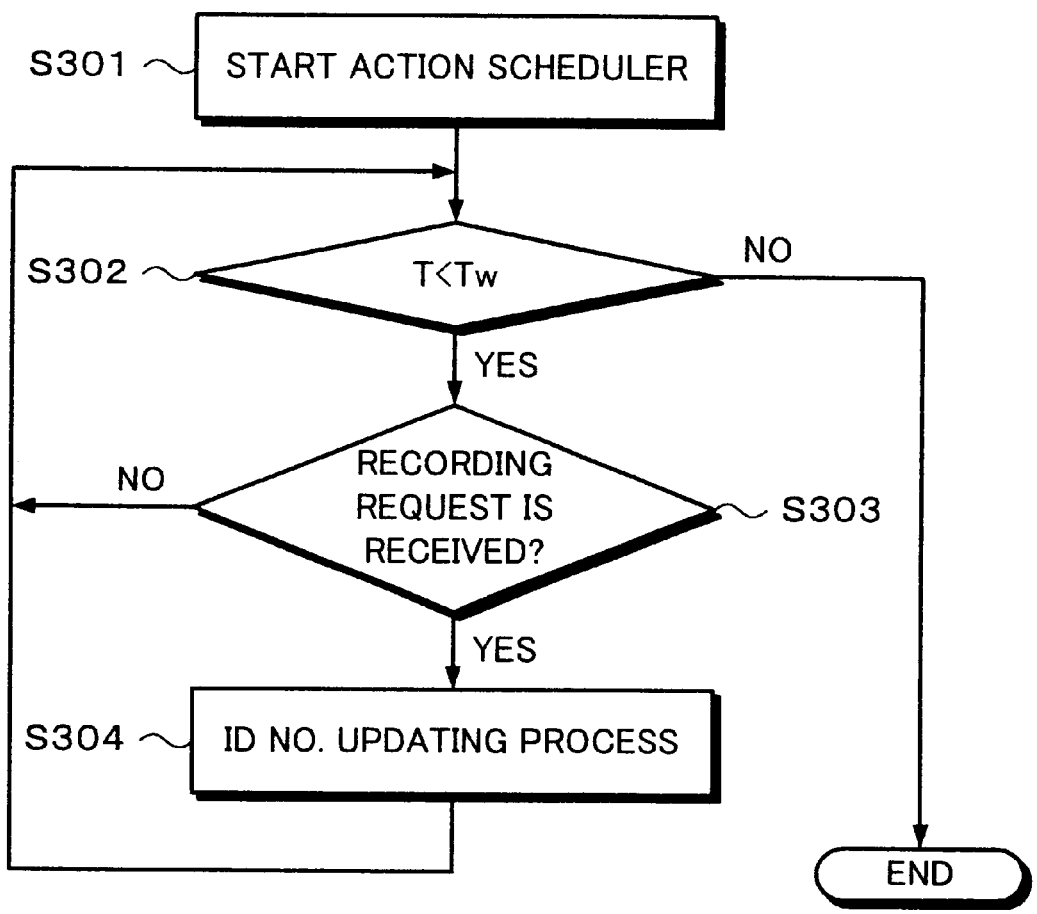
FIG. 16 is a timing chart showing an example of a processing procedure in the sixth embodiment of the invention.

FIG. 16 shows an example of a processing procedure for realizing processes according to the timing chart as shown in FIGS. 15A to 15D. In step S301, an updating process by an ActionScheduler is started. Specifically speaking, a timer of the transmitter is reset by using a bus reset signal as a trigger. The processing routine advances to step S302. Whether a time T that is measured by the timer reset in step S301 is smaller than Tw or not is discriminated. When T is determined to be smaller than Tw, step S303 follows. In the other cases, the processing routine is finished. In step S303, whether the recording request has been received or not is discriminated. When it is decided that the recording request has been received, step S304 follows. In the other cases, step S302 follows. In step S304, the updating process of the ID number is performed. Step S302 further follows.

The recording operation is permitted only to one recorder in the network in each of the foregoing embodiments of the invention. However, as for the operation such as reproducing operation, operation for receiving the information signal from an apparatus out of the network, or the like other than the recording operation, the restriction which is caused due to the operating situation of the other apparatus in the network is not applied (refer to FIGS. 17A to 17D). That is, for example, in case of a video deck or the like having both of the function to supply the video signal to the video display unit and the recording function, the video signal can be always supplied to the video display unit irrespective of whether the recorder under the recording operation exists in the network or not.

The foregoing first to sixth embodiments of the invention are made on the assumption that the signal process including the recording is performed to the information that is provided via the radio wave as a prerequisite. Besides it, the invention can be also applied to a case where the signal process including the recording is performed to the information that is provided via a telephone line, a specific wire line, or the like. For example, the invention can be also applied to a case where the signal process including the recording is performed to the information that is provided via a commercially available recording medium such as a CD (Compact Disc), DVD (Digital Versatile Disc), or the like.

The invention is not limited to the foregoing first to sixth embodiments or the like of the invention but many modifications and variations are possible within the spirit and scope of the appended claims of the invention.

According to the invention, when a plurality of apparatuses having the recording function exist in the signal processing system including the audio/visual apparatuses and the like, it is possible to prevent the plurality of apparatuses from executing the recording operation regarding the same information signal.

Particularly, in the toll information providing services, therefore, it is possible to prevent a plurality of copies from being formed from the provided information signal and the invention can contribute to optimization of a charging system of the information providing services.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A signal supplying apparatus for supplying a signal to each of apparatuses having a signal recording function in a signal processing system of the type that includes a plurality of apparatuses having the signal recording function, comprising means to permit a recording operation to a predetermined number of apparatuses having the signal recording function, and means are provided such that when an ID number is changed in the system of the apparatuses which are executing the recording operations, said apparatuses which are executing the recording operations declare that the self apparatus is executing the recording operation, so that said apparatuses which are executing the recording operation continue the recording operations.

2. An apparatus according to claim 1, wherein a signal which is supplied from an outside is received and the signal which is supplied to each of said apparatuses in said signal processing system is formed on the basis of the received signal.

3. An apparatus according to claim 1, further comprising a recording medium and the signal which is supplied to each of said apparatuses in said system is formed on the basis of data recorded on said recording medium.

4. An apparatus according to claim 1, wherein for a period of time during which a predetermined number of apparatuses among said predetermined number of apparatuses having the signal recording function are executing the recording operation, it is managed so as to limit a start of the recording operations by the other apparatuses.

5. An apparatus according to claim 4, wherein when the start of the recording operations by the other apparatuses is limited, it is managed so as to perform a display regarding said limitation.

6. An apparatus according to claim 4, wherein said other apparatuses are managed so as to recognize that the apparatuses which are executing the recording operations exist in said system without inquiring of the apparatuses which are executing the recording operations in association with the limitation of the recording operation by the apparatus which supplies said signal.

7. An apparatus according to claim 4, wherein said other apparatuses are notified of information regarding an identification of said apparatuses which are executing the recording operations.

8. An apparatus according to claim 7, wherein it is managed so that said other apparatuses identify said apparatuses which are executing the recording operations on the basis of said information.

9. An apparatus according to claim 1, wherein when the apparatuses which are executing the recording operation finish the recording operations, if the recording operations are requested by the other apparatuses, it is managed so that the recording operations regarding said requests are executed.

10. An apparatus according to claim 1, wherein it is managed so as to previously specify that said other apparatuses execute the recording operations after the apparatuses which are executing the recording operations finish the operations.

11. An apparatus according to claim 1, wherein it is managed so as to validate said declaration in the case where it is made within a predetermined period of time after the change of said identification numbers.

12. An apparatus according to claim 1, wherein the management is not performed with respect to operations other than the recording operations of the apparatuses having said signal recording function.

13. A signal processing method of supplying a signal to each of apparatuses having a signal recording function in a signal processing system including a predetermined number of apparatuses having the signal recording function, comprising permitting the recording operation to a predetermined number of apparatuses having said signal recording function and providing that when an ID number is changed in the system of the apparatuses which are executing the recording operations, said apparatuses which are executing the recording operations declare that the self apparatus is executing the recording operation, so that said apparatuses which are executing the recording operation continue the recording operations.

14. A record medium having recorded thereon a signal processing program operable with a processor to carry out the method of supplying a signal to each of apparatuses having a signal recording function in a signal processing system including a predetermined number of apparatuses having the signal recording function, comprising permitting the recording operation to a predetermined number of apparatuses having said signal recording function and providing that when an ID number is changed in the system of the apparatuses which are executing the recording operations, said apparatuses which are executing the recording operations declare that the self apparatus is executing the recording operation, so that said apparatuses which are executing the recording operation continue the recording operations.

* * * * *